US012679526B2

(12) United States Patent
Roustom et al.

(10) Patent No.: US 12,679,526 B2
(45) Date of Patent: Jul. 14, 2026

(54) MONOLITHIC AND INTEGRALLY FORMED HINGE STRUCTURE FOR AN AIRCRAFT

(71) Applicant: AEVEX Aerospace, LLC, Solana Beach, CA (US)

(72) Inventors: Salim Adam Roustom, Vienna, VA (US); Hugo Bouvier Schroeder, Reston, VA (US)

(73) Assignee: AEVEX Aerospace, LLC, Solana Beach, CA (US)

( * ) Notice: Subject to any disclaimer, the term of this patent is extended or adjusted under 35 U.S.C. 154(b) by 0 days.

(21) Appl. No.: 18/427,120

(22) Filed: Jan. 30, 2024

(65) Prior Publication Data

US 2024/0253767 A1     Aug. 1, 2024

Related U.S. Application Data

(60) Provisional application No. 63/442,356, filed on Jan. 31, 2023.

(51) Int. Cl.
B33Y 10/00          (2015.01)
B33Y 80/00          (2015.01)
(Continued)

(52) U.S. Cl.
CPC ............... B64C 9/02 (2013.01); B33Y 10/00 (2014.12); B33Y 80/00 (2014.12); B64C 9/16 (2013.01)

(58) Field of Classification Search
CPC ........... B33Y 10/00; B33Y 80/00; B64C 9/02; B64C 9/16; B64C 9/14; B64C 9/18;
(Continued)

(56) References Cited

U.S. PATENT DOCUMENTS 8,876,473  B2     11/2014   Westergaard et al.
11,535,361 B2     12/2022   Belik et al.
                  (Continued)

FOREIGN PATENT DOCUMENTS

CN        102414441   A      4/2012
CN        115489718   A      4/2012
JP        2020500761  A      1/2020

OTHER PUBLICATIONS

International Search Report and Written Opinion, dated May 3, 2024, for related International Application No. PCT/US2024/013495, filed Jan. 30, 2024 (16 pages).

*Primary Examiner* — Galen H Hauth
*Assistant Examiner* — Baileigh Kate Darnell
(74) *Attorney, Agent, or Firm* — Alston & Bird LLP

(57)          ABSTRACT

In accordance with one embodiment of the present disclosure, an aircraft assembly is described. The aircraft assembly can include an airfoil structure, which can extend in a chordwise direction from a leading edge to a trailing edge and can include a first component having one or more hinge loops. The first component can have one or more hinge loops that include a first monolithic, integrally formed structure. The airfoil structure can also include a rear component positioned behind the first component in the chordwise direction. The rear component can have an interface member extending within the one or more hinge loops. The rear component, including the interface member, can include a second monolithic, integrally formed structure.

15 Claims, 15 Drawing Sheets

(51) Int. Cl.
   B64C 9/02          (2006.01)
   B64C 9/16          (2006.01)

(58) Field of Classification Search
   CPC ....... B64C 9/20; B64C 9/30; B64C 2009/005;
              B64C 2009/143; B64C 3/00; B64C 3/14;
                 B64C 5/00; B64C 5/08; B64C 5/10
   See application file for complete search history.

(56)                    References Cited

U.S. PATENT DOCUMENTS

2007/0152098 A1      7/2007  Sheahan, Jr. et al.
2009/0034208 A1      2/2009  Suzuki
2015/0274280 A1 *   10/2015  Sheahan, Jr.  ........... B64C 13/26
                                                          244/99.2
2019/0292821 A1      9/2019  Gunner et al.
2021/0009255 A1 *    1/2021  Gruner .................... B64C 13/34
2021/0245865 A1      8/2021  Alvizures et al.

* cited by examiner

MONOLITHIC AND INTEGRALLY FORMED HINGE STRUCTURE FOR AN AIRCRAFT

CROSS REFERENCE TO RELATED APPLICATIONS

This application claims the benefit of and priority to U.S. Provisional Application No. 63/442,356 filed Jan. 31, 2023 and entitled "MONOLITHIC AND INTEGRALLY FORMED HINGE STRUCTURE FOR AN AIRCRAFT", the entire contents of which are hereby incorporated herein.

FIELD

The present disclosure generally pertains to a structure of a vehicle. More specifically, the present disclosure pertains to a hinge structure of an additive manufactured vehicle, such as an aircraft.

BACKGROUND

Additive manufacturing is a manufacturing process that sequentially adds or "prints" thin layers of material on top of each other to form an object. Additive manufacturing of an object, including a part for a structure, is desirable as it provides the ability to rapidly change out parts and keep the stock of parts low. However, the current technology still requires separate additive manufacture printing processes, followed by post-printing mechanical assembly, for parts coupled together with a degree of rotational freedom, such as but not limited to a control surface and a wing (or other airfoil structure) for an aircraft. In this respect, the current technology increases manufacturing time and cost with respect to both the printing process itself, and the subsequent mechanical assembly process.

SUMMARY

This summary is provided to introduce a selection of concepts in a simplified form that are further described below in the detailed description. This summary is not intended to identify key features of the claimed subject matter, nor is it intended to be used as an aid in determining the scope of the claimed subject matter.

In accordance with one embodiment of the present disclosure, an aircraft assembly is described. The aircraft assembly may include an airfoil structure extending in a chordwise direction from a leading edge to a trailing edge, the airfoil structure comprising: a first component comprising one or more hinge loops, wherein the first component, including the one or more hinge loops, comprises a first monolithic, integrally formed structure; and a rear component positioned behind the first component in the chordwise direction, the rear component comprising an interface member extending within the one or more hinge loops, wherein the rear component, including the interface member, comprises a second monolithic, integrally formed structure.

In accordance with another embodiment of the present disclosure, a method of manufacturing an airfoil structure of an aircraft assembly, the airfoil structure extending in a chordwise direction from a leading edge to a trailing edge, is described. The method may include printing, on a 3D printer platform using an additive manufacturing process, a first component of the airfoil structure as a first monolithic, integrally formed structure, wherein the first component includes one or more hinge loops; and during printing of the first component, printing, on the 3D printer platform using the additive manufacturing process, a rear component of the airfoil structure as a second monolithic, integrally formed structure, wherein the rear component includes an interface member extending within the one or more hinge loops.

In any of the embodiments described herein, the interface member may define a passage extending therewithin, and the aircraft assembly may further comprise a steering member positioned within the passage, the steering member configured to cooperate with the interface member to pivot the rear component relative to the first component.

In any of the embodiments described herein, the steering member may define a circumferentially outer surface, the interface member may comprise a circumferentially inner surface that defines the passage, and the outer surface of the steering member may be keyed to engage the inner surface of the interface member in rotational motion to pivot the rear component relative to the first component.

In any of the embodiments described herein, the outer surface of the steering member may have a first hexagonal shape and the inner surface of the interface member may have a second hexagonal shape complementary to the first hexagonal shape.

In any of the embodiments described herein, the aircraft assembly may further include a fuselage coupled to the airfoil structure and a motor coupled to at least one of the airfoil structure and the fuselage, the motor configured to rotationally drive the steering member.

In any of the embodiments described herein, the rear component further comprises at least one feature extending outward from the interface member, and the aircraft assembly may further comprise a motor drivingly coupled to the at least one feature to pivot the rear component relative to the first component.

In any of the embodiments described herein, the at least one feature may comprise a first gear member, and the aircraft assembly may further comprise a second gear member in geared cooperation with the first gear member, wherein the second gear member may be rotationally drivable by the motor to pivot the rear component relative to the first component.

In any of the embodiments described herein, the rear component may extend in the chordwise direction from the interface member to the trailing edge.

In any of the embodiments described herein, the first component may extend in the chordwise direction from the leading edge to the one or more hinge loops.

In any of the embodiments described herein, the rear component may further comprise: a body portion positioned behind the interface member in the chordwise direction; and one or more attachment portions affixing the interface member to the body portion.

In any of the embodiments described herein, the interface member may comprise an outer surface, and each of the one or more attachment portions may extend from the outer surface of the interface member to the body portion.

In any of the embodiments described herein, the one or more attachment portions may be interdigitated with the one or more hinge loops.

In any of the embodiments described herein, at least one of the one or more attachment portions may define a free edge that tapers at an acute angle relative to a spanwise direction.

In any of the embodiments described herein, the one or more hinge loops may be circumferentially closed about an axis that extends in a spanwise direction.

In any of the embodiments described herein, at least one of the one or more hinge loops may define a free edge that tapers at an acute angle relative to a spanwise direction.

In any of the embodiments described herein, the additive manufacturing process may include depositing a plurality of layers on the 3D printer platform; the first component may include a plurality of first-component layers; the rear component may include a plurality of rear-component layers; and the method may further comprise depositing, in a first sequence of co-component layers of the plurality of layers, a first sequence of the plurality of rear-component layers and a first sequence of the plurality of first-component layers.

In any of the embodiments described herein, the method may further comprise maintaining, throughout the printing of the first component and the printing of the rear component, a clearance gap between the plurality of rear-component layers and the plurality of first-component layers, the clearance gap sufficient to prevent fusion between the plurality of rear-component layers and the plurality of first-component layers.

In any of the embodiments described herein, the first sequence of rear-component layers may include a portion of the interface member and the first sequence of first-component layers may include a portion of the one or more hinge loops, and the portion of the one or more hinge loops may circumscribe the portion of the interface member.

In any of the embodiments described herein, the portion of the one or more hinge loops may be circumferentially closed within the first sequence of co-component layers.

In any of the embodiments described herein, printing the rear component may include printing a body portion positioned behind the interface member in the chordwise direction and printing one or more attachment portions affixing the interface member to the body portion.

In any of the embodiments described herein, the method may further comprise depositing, in a second sequence of co-component layers of the plurality of layers, a second sequence of the plurality of rear-component layers and a second sequence of the plurality of first-component layers, wherein the second sequence of rear-component layers may include a portion of the body portion and a portion of the one or more attachment portions, and the second sequence of first-component layers may be offset, in a stacking direction of the plurality of layers, from each of the one or more hinge loops.

In any of the embodiments described herein, printing the rear component may comprise printing a free edge of at least one of the one or more attachment portions, the free edge tapering outward at an acute angle relative to a stacking direction of the plurality of layers.

In any of the embodiments described herein, printing the first component may comprise printing a free edge of at least one of the one or more hinge loops, the free edge tapering outward at an acute angle relative to a stacking direction of the plurality of layers.

In any of the embodiments described herein, printing the rear component may comprise printing an inner surface of the interface member, the inner surface defining a passage configured to receive a steering component therein, wherein the inner surface may be configured to engage a keyed outer surface of the steering member to pivot the rear component relative to the first component in response to rotational motion of the steering member.

In any of the embodiments described herein, the inner surface of the interface member may have a second hexagonal shape configured to be complementary to a first hexagonal shape of an outer surface of the steering member.

In any of the embodiments described herein, printing the rear component may comprise printing at least one feature extending outward from the interface member, the at least one feature configured to be driven by a motor to pivot the rear component relative to the first component.

In any of the embodiments described herein, printing the at least one feature may comprise printing a first gear member configured for geared cooperation with a second gear member driven by a motor.

BRIEF DESCRIPTION OF THE DRAWINGS

The novel features of the disclosure are set forth with particularity in the appended claims. A better understanding of the features and advantages of the present disclosure will be obtained by reference to the following detailed description that sets forth illustrative examples, in which the principles of the disclosure are utilized, and the accompanying drawings of which:

DETAILED DESCRIPTION

Figure 1:
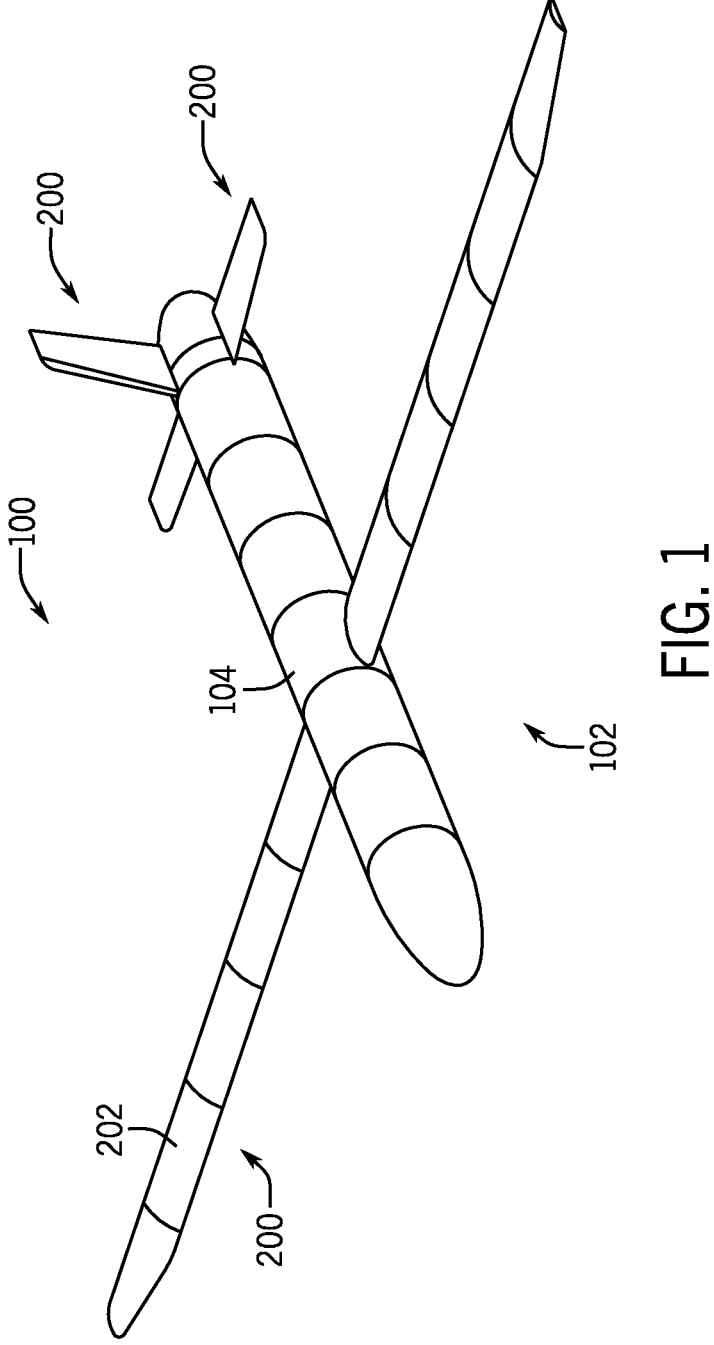
FIG. 1 illustrates a perspective view of an aircraft assembly in accordance with one or more embodiments of the present disclosure.

Utilizing additive manufacturing techniques to manufacture parts for an assembly can have several advantages over conventional manufacturing techniques. Additive manufacturing, for example, allows for more complex designs of a part, minimizes waste, and can lead to faster production times over conventional manufacturing techniques. These advantages can be realized in several industries. For example, a craftsperson can utilize additive manufacturing techniques to manufacture parts for an aircraft. In some situations, the frame, wings, fuselage, payload bays, booms, rotor blades, propellers, landing gear, control surfaces, and other aircraft components can be formed and assembled together using additive manufacturing techniques.

In some applications, forming an assembly with parts manufactured through conventional techniques may require several steps to couple parts together to form the assembly. For example, some assemblies can require that certain parts be joined together through welding or may require that certain parts being fastened together with fasteners, such as but not limited to hinge pins. These processes can be difficult and time-consuming. which can ultimately lead to an increase in costs for assembly.

The present disclosure addresses these and other issues with respect to manufactured components, and in particular, manufactured components for aircraft. As described in further detail herein, the aircraft components described herein can be manufactured through an additive manufacturing technique, which can allow for some components of present disclosure to be interconnected during the manufacturing process. For example, an airfoil structure having two components coupled together by a pivoting hinge can be manufactured in a unified process on the bed or platform of a 3D printer, in the coupled arrangement, using an additive technique. The two components and the features defining the pivoting hinge can be formed from two or more monolithic and integrally formed structures. In other words, these parts can be formed in a manner the couples the two structures together during the formation process. This process can decrease the time it takes to assemble the final aircraft structure and can also decrease the overall manufacturing time and cost.

An airfoil structure formed from the additive manufacturing techniques described herein can also result in an airfoil structure with an improved aerodynamic profile. For example, the airfoil structure can have a cleaner outer mold line when compared to a traditional airfoil structure, as the present airfoil structure does not require any external mounted components to implement or adjust the pivoting hinge. Instead, in some examples, the pivoting hinge can be adjusted through use of a steering member that is positioned inward of the outer mold line. This arrangement can reduce parasitic drag on the airfoil structure and improve the controllability of the aircraft. These and other advantages of the present disclosure will be described in more detail herein.

FIG. 1 illustrates a perspective view of an aircraft assembly 100. The aircraft assembly 100 is a vehicle that can achieve flight for various purposes, such as shipping, transportation, and recreation. The aircraft assembly 100 may be configured for on-board crew or may be an unmanned aerial vehicle. The aircraft assembly 100 can include a fuselage 102 that is coupled to one or more airfoil structures 200, which can form the wings, vertical stabilizers, and horizontal stabilizers of the aircraft assembly 100. The fuselage 102 can form the main body of the aircraft assembly 100 and can be used to house a crew, passengers, or cargo. The airfoil structures 200 can extend off to one or more sides of the fuselage 102 and can be used to create lift, stabilize the aircraft assembly 100 during flight, and steer the aircraft assembly 100. In addition to these aircraft components, the aircraft assembly 100 can also include other aircraft components that can assist with flight or other operational purposes, including, for example, engines, control surfaces (such as ailerons, flaps, elevators, rudders, etc.), payload bays, booms, propellers, landing gear, frames, avionics, control systems, and communication systems. Although embodiments of the present disclosure are directed to an aircraft assembly 100, these embodiments can be directed to other vehicles, such as cars, helicopters, and watercraft.

Some embodiments of the present disclosure can be directed to an additively manufactured aircraft assembly 100. Notably, the components of the aircraft assembly 100 can be manufactured from an additive manufacturing process and assembled together. For example, the fuselage 102 can be assembled from one or more fuselage segments, such as the fuselage segments 104, which are each manufactured separately by an additive manufacturing process. Similarly, the airfoil structure 200 can be assembled from one or more airfoil structure segments, such as the airfoil structure segments 202, which are each manufactured separately by an additive manufacturing process. This manufacturing process allows for the aircraft assembly 100 to be quickly assembled and also allows for greater customization of the aircraft assembly's 100 design. For example, an additive manufacturing process can allow for the fuselage segments 104, airfoil structure segments 202, or other airframe structures to have a more complex design that is integrally formed as a monolithic structure. Additionally, the additive manufacturing process can greatly improve a production rate for manufacturing the components, despite the more complex design. For example, as described in more detail below, the additively manufactured airfoil structure segments 202 may be integrally formed with control surfaces rather than requiring expensive manufacturing processes to form these components separately and couple them together.

Figure 2:
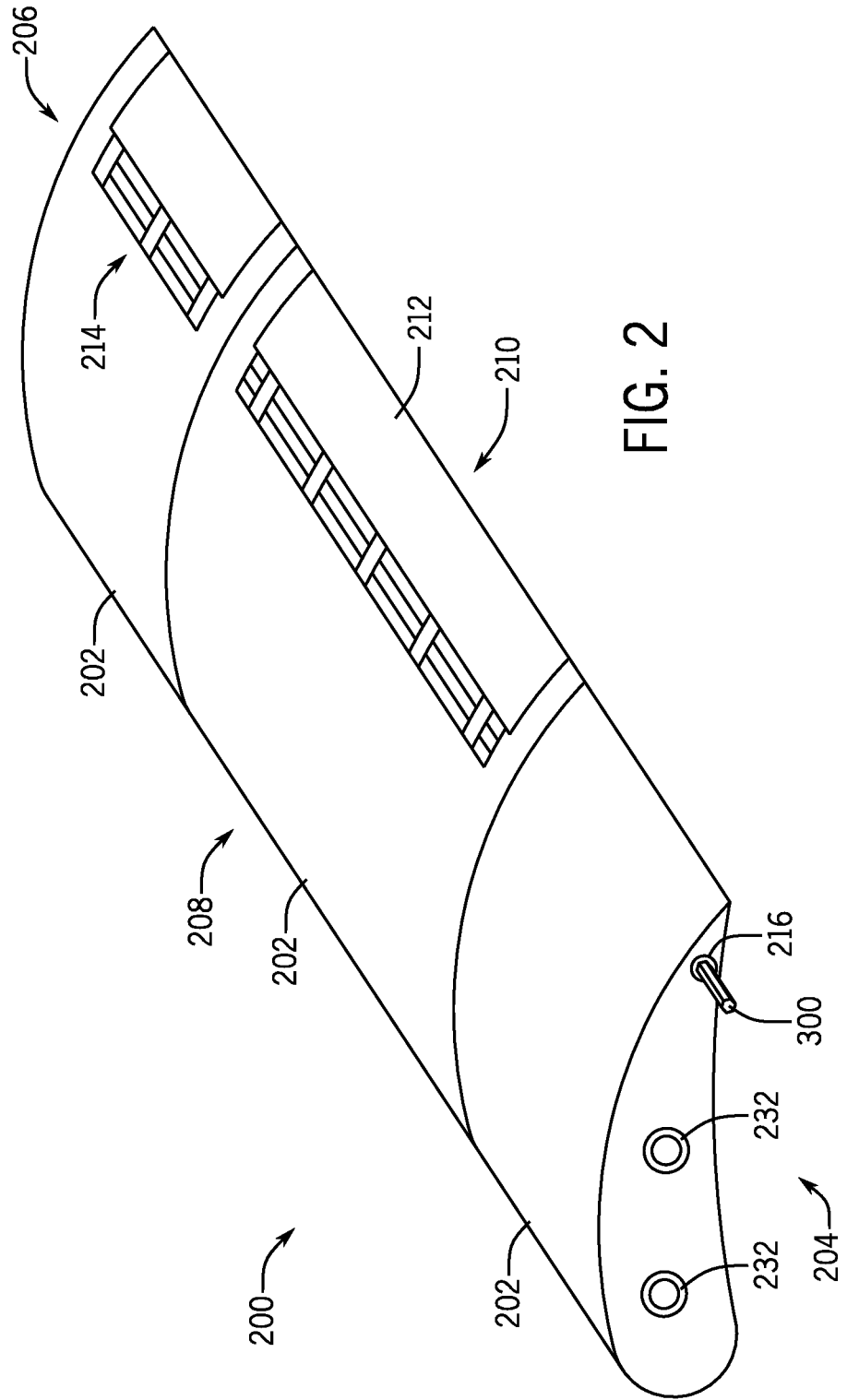
FIG. 2 illustrates a perspective view of an airfoil structure that may be used with the aircraft assembly of FIG. 1 in accordance with one or more embodiments of the present disclosure.

FIG. 2 illustrates a perspective view of an airfoil structure 200 that may be used with the aircraft assembly 100. As shown in FIG. 2, the airfoil structure 200 can include several airfoil structure segments 202 that are coupled together between a first end 204 and second end 206 to form the airfoil structure 200. In the illustrated embodiment, some of the airfoil structure segments 202 can themselves include multiple components. For example, some of the airfoil structure segments 202 can include a first component 208 and a rear component 210 which couple together to form the airfoil structure segment 202. The first and rear components 208, 210 allow for the airfoil structure segment 202 to carry out one or more functions. For instance, the rear component 210 can include a control surface 212 that can pivot relative to the first component 208 for maneuvering the aircraft assembly 100.

When operating the aircraft assembly 100, it is important that the pilot or other operator (which may include an autopilot) is able to precisely and reliably control the control surfaces 212 of the airfoil structure 200, as this precise and reliable control of the control surfaces 212 allows for the operator to maneuver the aircraft assembly 100 as desired. The aircraft assembly 100 can include one or more components that allow for the operator to pivot the rear component 210 relative to the first component 208 and thereby control the control surface 212 as desired. For example, as will be described in more detail herein, the first and rear components 208, 210 can couple together in a manner that forms an adjustable hinge assembly 214 which can be manipulated by the operator to adjust the control surfaces 212.

Figure 3:
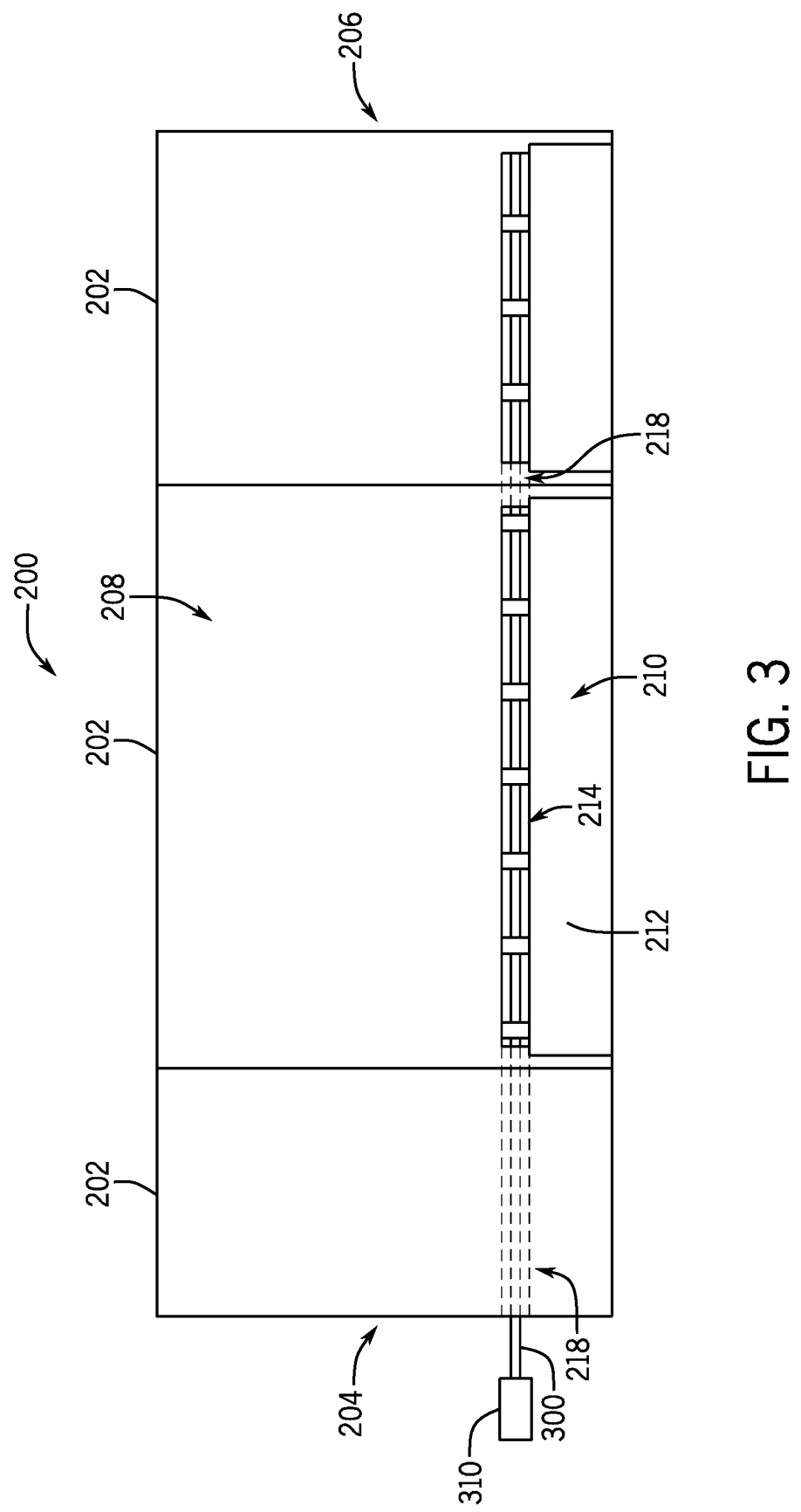
FIG. 3 illustrates a top view of the airfoil structure of FIG. 2 with a steering member in accordance with one or more embodiments of the present disclosure.
Figure 4:
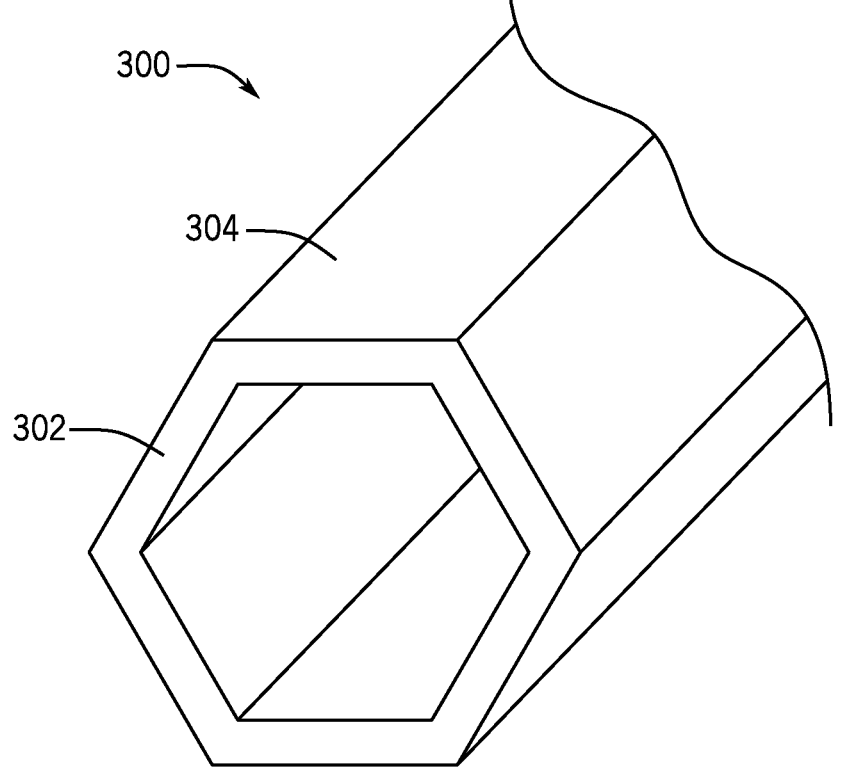
FIG. 4 illustrates a perspective view of a steering member that may be used with airfoil structure of FIG. 2 in accordance with one or more embodiments of the present disclosure.

FIG. 3 illustrates a top view of an airfoil structure 200 of FIG. 2 and FIG. 4 illustrates a perspective view of a steering member 300. Referring to FIGS. 2-4 together, the airfoil structure 200 can include the hinge assembly 214 coupled to a steering member 300 for controlling the control surfaces 212. As shown in FIG. 3, the first and rear components 208, 210 can couple together at the hinge assembly 214, which can adjust the first and rear components 208, 210 relative to one another. The hinge assembly 214 can be formed within the airfoil structure 200 at the interface between the first and rear components 208, 210 and can extend in the spanwise direction along at least a portion of the length of each control surface 212. In some examples, the hinge assembly 214 can be coupled to the control surface 212 (e.g., by coupling to the rear component 210) and, as a result of this arrangement, the hinge assembly 214 can adjust the control surface 212 when the hinge assembly 214 is itself adjusted. Stated differently, the hinge assembly 214 can be configured to adjust the control surface 212 by pivoting the rear component 210 upwards or downwards relative to the first component 208.

The hinge assembly 214 can be adjusted through manipulating the steering member 300. In some examples, the steering member 300 can extend within the hinge assembly 214 and couple to an internal surface of the hinge assembly 214, which allows for rotation of the steering member 300 about a spanwise axis to adjust the hinge assembly 214. In some of these examples, or otherwise, the steering member 300 can be extend within multiple hinge assemblies 214 along a span of the airfoil structure 200. For instance, as shown in FIG. 3, a single steering member 300 can extend within two hinge assemblies 214 defined on two airfoil structure segments 202 and aligned along the spanwise direction. This arrangement allows for movement of the steering member 300 to adjust both hinge assemblies 214. Additionally, as illustrated in FIGS. 2 and 3, the steering member 300 can be positioned inward from the outer mold line of the airfoil structure 200 when coupled to the hinge assembly 214. By positioning the steering member 300 in this manner, the steering member 300 does not itself create any drag when adjusting the hinge assembly 214.

One or more of the airfoil structure segments 202 may include a pass-through channel 218 aligned with the hinge assemblies 214 along the spanwise direction. The pass-through channel 218 can be sized to receive the steering member 300 in a clearance fit, such that rotational motion of the steering member 300 about a spanwise axis does not interact with the corresponding airfoil structure segment 202 (or, stated another way, the corresponding airfoil structure segment 202 does not interfere with the rotational motion of the steering member 300). Accordingly, the steering member 300 selectively interacts only with the hinge assemblies 214. Although the pass-through channel 218 is illustrated as an elongated channel only slightly wider than the steering member 300, it is also contemplated that the pass-through channel 218 may be defined, at least in part, by a hollow interior cross-section of the airfoil structure segment 202. Other configurations of the pass-through channel 218 are also contemplated. In some embodiments, one or more bearings (not shown) may be positioned within the pass-through channel 218 to stabilize the steering member 300 while not substantially impeding rotational motion of the steering member 300.

To insert the steering member 300 into the hinge assembly 214, the steering member 300 can be received within an aperture 216, formed at the first end 204 of the airfoil structure 200, that provides access to one or more hinge assemblies 214 and one or more pass-through channels 218, aligned along the spanwise direction. For example, as shown in FIG. 3, the airfoil structure 200 can include a first interface channel 218 that extends from the aperture 216 within a first segment 202 of the airfoil structure 200 along the spanwise direction and into flow communication with a second pass-through channel 218 defined within an adjacent second segment 202. The second pass-through channel is aligned with a hinge assembly 214 on the second segment 202, and a third pass-through channel 218 extends from an opposite end of the hinge assembly 214 to an end of the second segment 202 and into flow communication with a fourth pass-through channel 218. The fourth pass-through channel 218 is defined in an adjacent third segment 202 and is aligned with another hinge assembly 214 on the third segment 202. Thus, the aligned pass-through channels 218 can extend across several airfoil structure segments 202 and between hinge assemblies 214, cooperating to form a path for spanwise insertion of the steering member 300. Accordingly, in some embodiments, the steering member 300 can be operatively coupled to the hinge assemblies 214 by inserting the steering member 300 through the aligned pass-through channels 218 and hinge assemblies 214. Although the illustrated example includes pass-through channels 218 defined in three spanwise-adjacent airfoil structure segments 202 and aligned with two hinge assemblies 214, other numbers of airfoil structure segments 202, pass-through channels 218, and hinge assemblies 214 are also contemplated.

In some embodiments, the steering member 300 can be rotationally coupled to at least a portion of the hinge assembly 214. In some of these examples, or otherwise, the steering member 300 can have a keyed feature which mates with a complimentary feature included with the hinge assembly 214. For instance, as illustrated in FIG. 4, the steering member 300 can have a body 302 that defines a circumferentially outer surface 304 that has a hexagonally shaped cross-section in a plane normal to the spanwise direction. This hexagonally shaped outer surface 304 can mate with a corresponding shaped feature included with the hinge assembly 214, such as an inner surface 252 (shown in FIG. 7A). As will be described in more detail herein, these or other keyed features can allow for the hinge assembly 214 and steering member 300 to rotate together about a spanwise axis when a rotational force (for example, from a motor 310, as described below) is applied to one of these components (e.g., the keyed feature of the steering member 300 can engage with the hinge assembly 214 to rotate the hinge assembly 214 when a driving rotational force is applied to the steering member 300). Accordingly, by rotating the steering member 300 an operator can also adjust the control surface 212 (e.g., through rotating the hinge assembly 214 which in turn adjusts the rear component 210 and control surface 212) as desired.

It should be understood that the keyed feature of the steering member 300 illustrated herein is non-limiting, and other cooperative interfaces between the steering member 300 and the one or more hinge assemblies 214 are also contemplated. As one example, steering member 300 may include a cylindrical shaped body 302 with a tab extending outward from the body 302. As another example, the steering member 300 may have an outer surface 304 that is rectangular shaped. Other examples of arrangements are possible and contemplated.

In operation, the steering member 300 can be manipulated (e.g., driven to rotate about a spanwise axis) by one or more components, such as an actuator or a motor 310. These components (e.g., the actuator, motor, etc.) can couple to the steering member 300 and to at least one of the airfoil structure 200 and the fuselage 102. To couple the steering member 300 to one of these components, these components need to be able to access the steering member 300 along some portion of the steering member's 300 length or at an end of the steering member 300. In some embodiments, the steering member 300 can be accessible outside of the airfoil structure 200. For example, as shown in FIGS. 2 and 3, a portion of the steering member 300 can extend beyond the first end 204 of the airfoil structure 200 and into a coupling with the actuator or motor 310. In some of these examples, or otherwise, arranging the steering member 300 in this manner can allow for the steering member 300 to be adjusted from within the fuselage 102. For instance, the portion of the steering member 300 that extends beyond the first end 204 of the airfoil structure 200 can extend into the fuselage 102 where the motor 310 and, optionally, one or more linking components can access and manipulate the steering member 300 as desired. Additionally, or alternatively, the steering member 300 can be accessible to a driving component within the airfoil structure 200. In some of these embodiments, or otherwise, the airfoil structure 200 can include a hollow interior where one or more components that can manipulate the steering member 300 (e.g., similar to the motor 310) can be installed and coupled to the steering member 300. In some examples, these components coupled to the steering member 300 (e.g., the actuator, motor 310, etc.) are positioned inward from the outer mold line, which can improve the aerodynamic profile of the airfoil structure 200.

It should be understood that the arrangements of the steering member 300 within the airfoil structure 200 described herein are non-limiting, and other arrangements of the steering member 300 are also contemplated. As one example, the airfoil structure 200 may include multiple steering members 300 each separately being operable to adjust a particular control surface 212 independently from other control surfaces 212 formed on the airfoil structure 200. As another example, the steering member 300 may be accessible at a location that is external to both the airfoil structure 200 and the fuselage 102. As another example, the aircraft assembly 100 can include several motors 310 which can couple to the steering member 300 at various locations along the length of the steering member 300. For instance, a first motor 310 can couple to the steering member 300 at or near the fuselage 102 while a second motor 310 couple to the steering member 300 near the midspan of the airfoil structure 200. This arrangement can decrease the overall load applied to each motor 310. Other examples of arrangements are possible and contemplated.

Figure 5A:
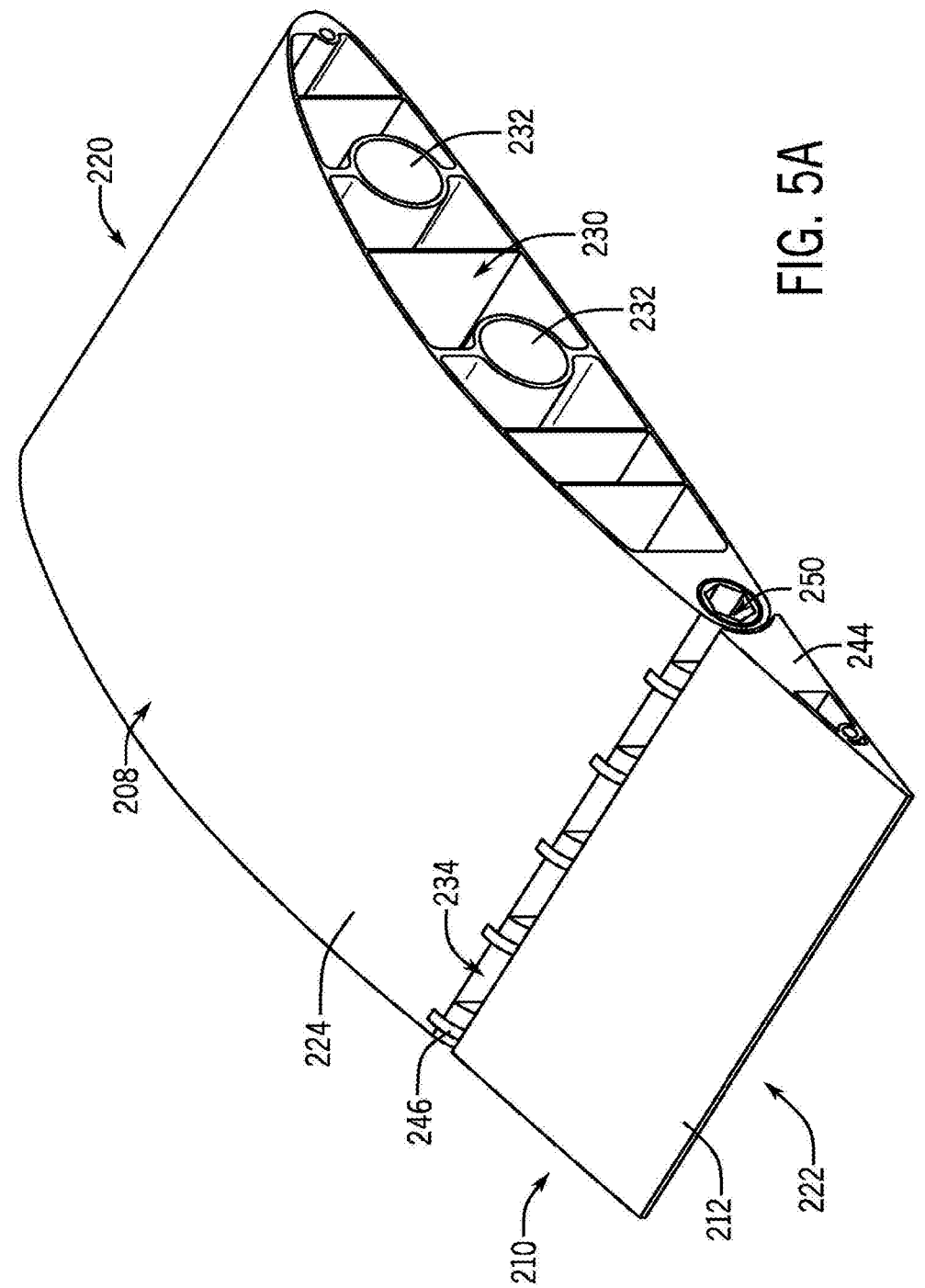
FIGS. 5A-5C illustrate a perspective, top, and side view of an airfoil structure segment that may be used with the aircraft assembly of FIG. 1 in accordance with one or more embodiments of the present disclosure.
Figure 5B:
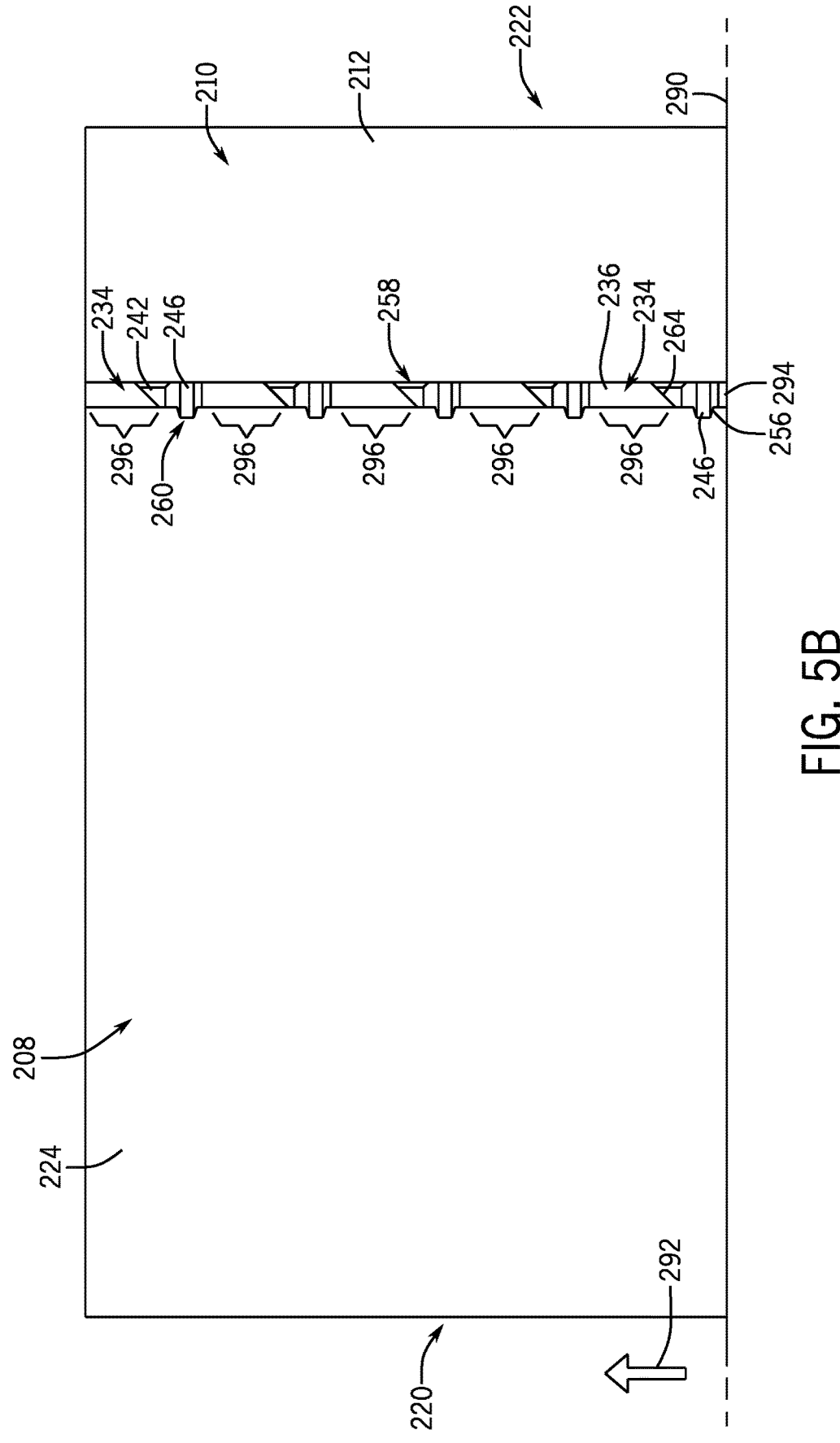
Figure 5C:
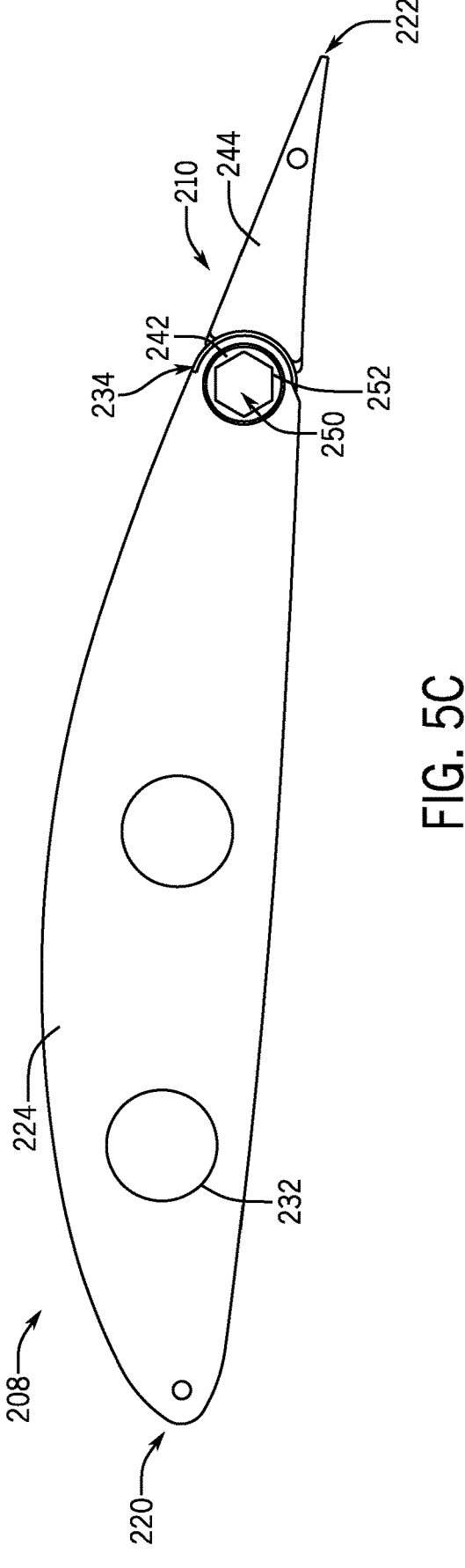
Figure 6A:
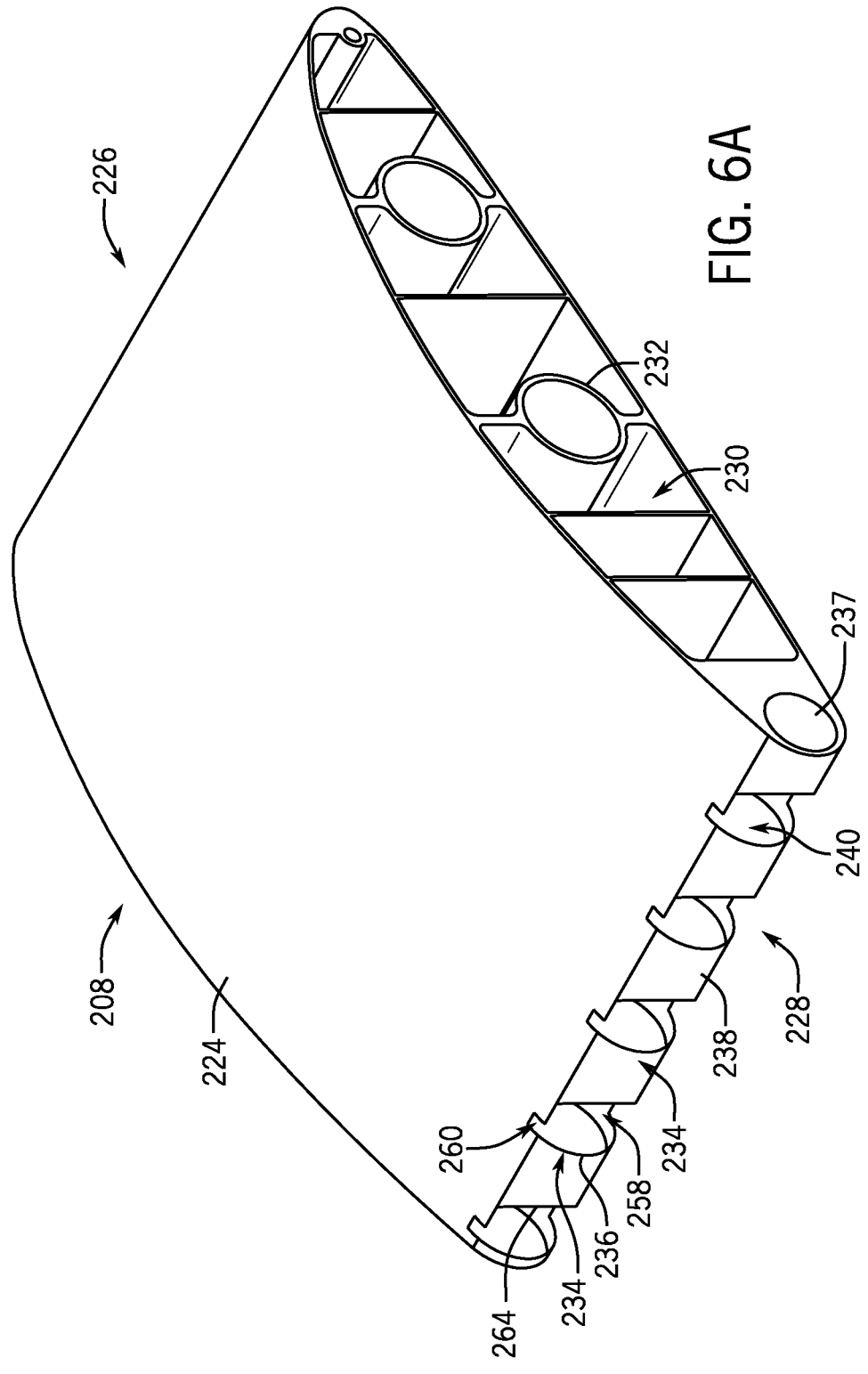
FIGS. 6A-6C illustrate a perspective, top, and side view of a first component of the airfoil structure segment of FIGS. 5A-5C in accordance with one or more embodiments of the present disclosure.
Figure 6B:
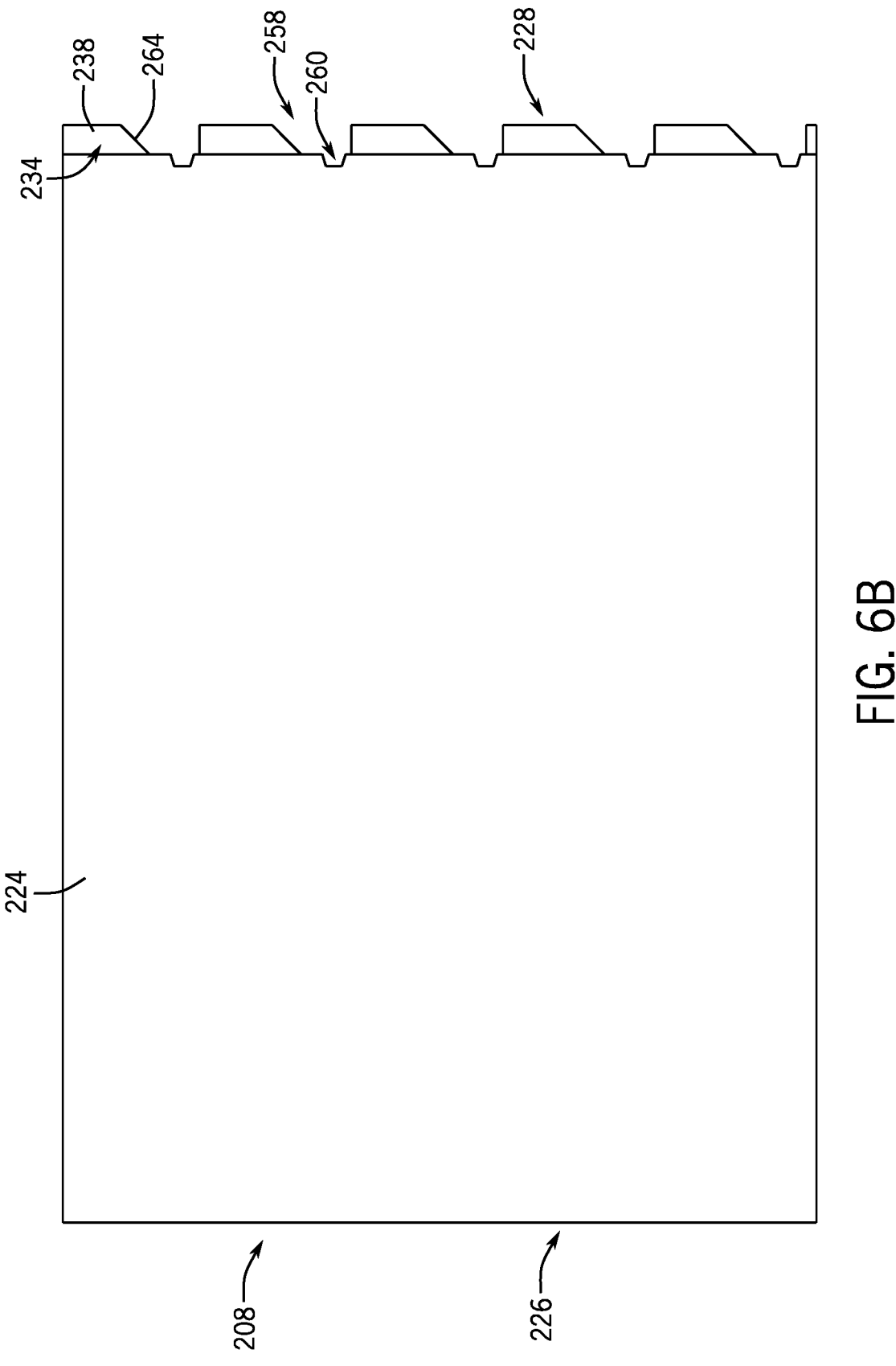
Figure 6C:
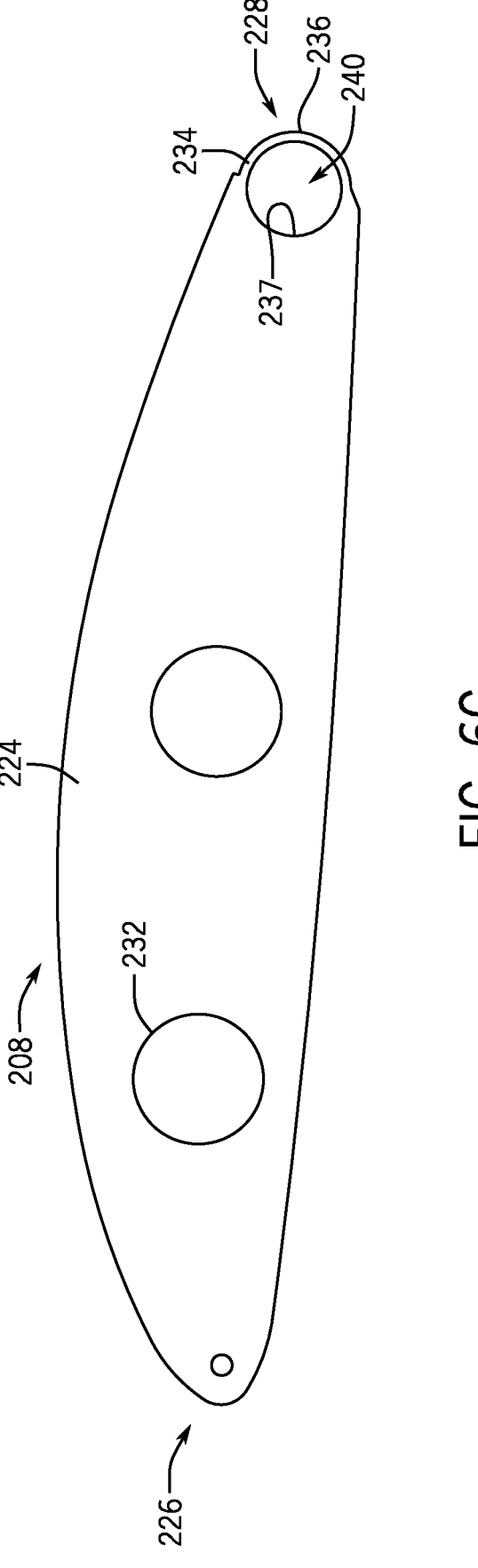
Figure 7A:
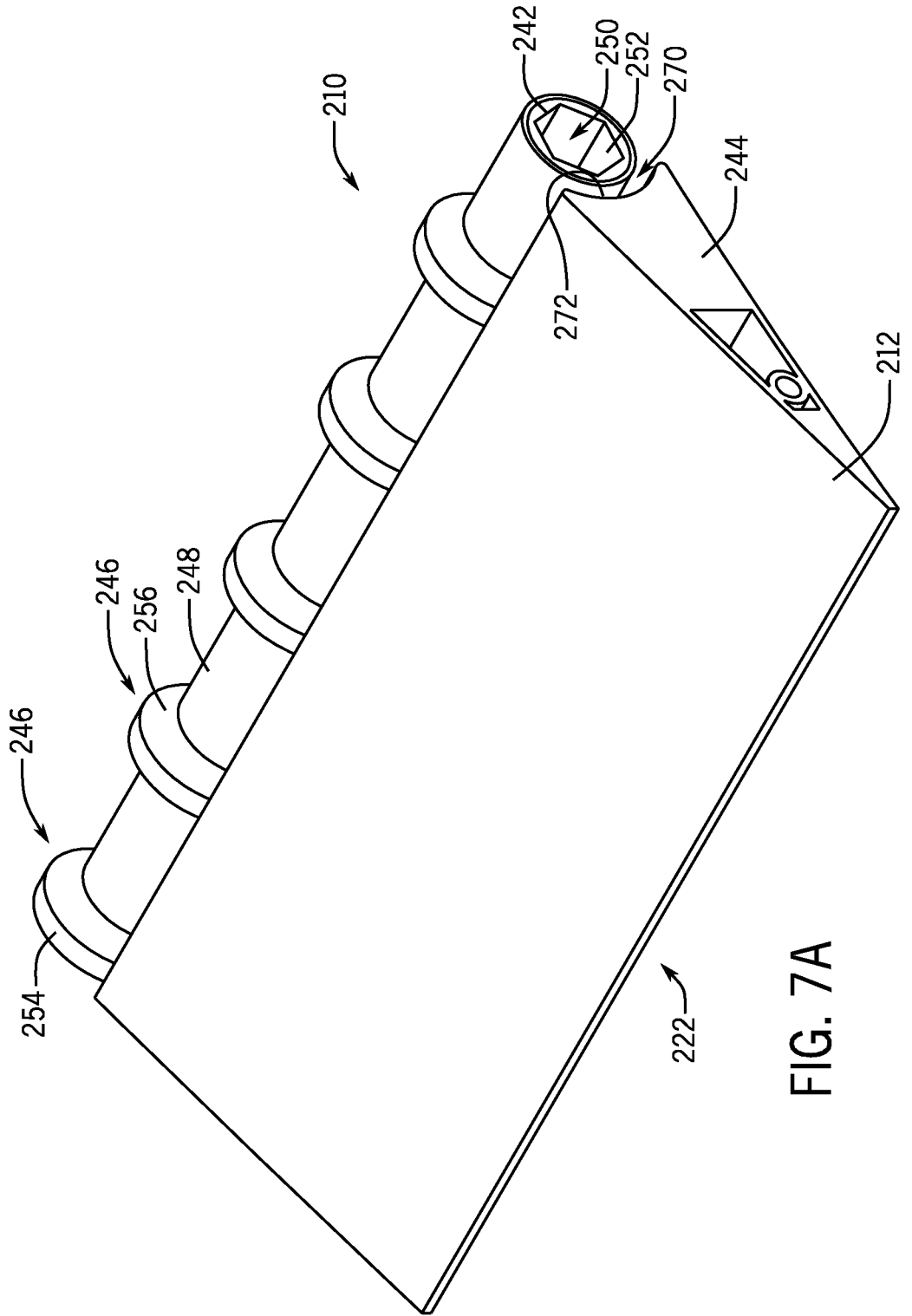
FIGS. 7A-7C illustrate a perspective, top, and side view of a rear component of the airfoil structure segment of FIGS. 5A-5C in accordance with one or more embodiments of the present disclosure.
Figure 7B:
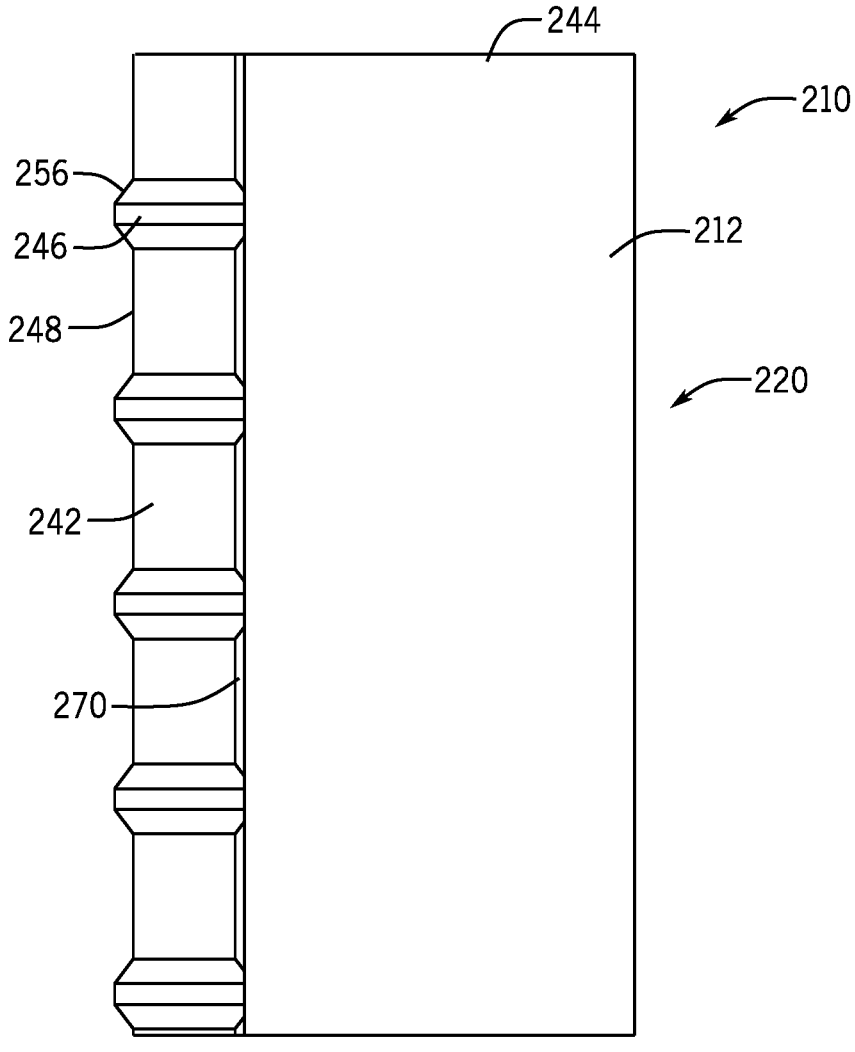
Figure 7C:
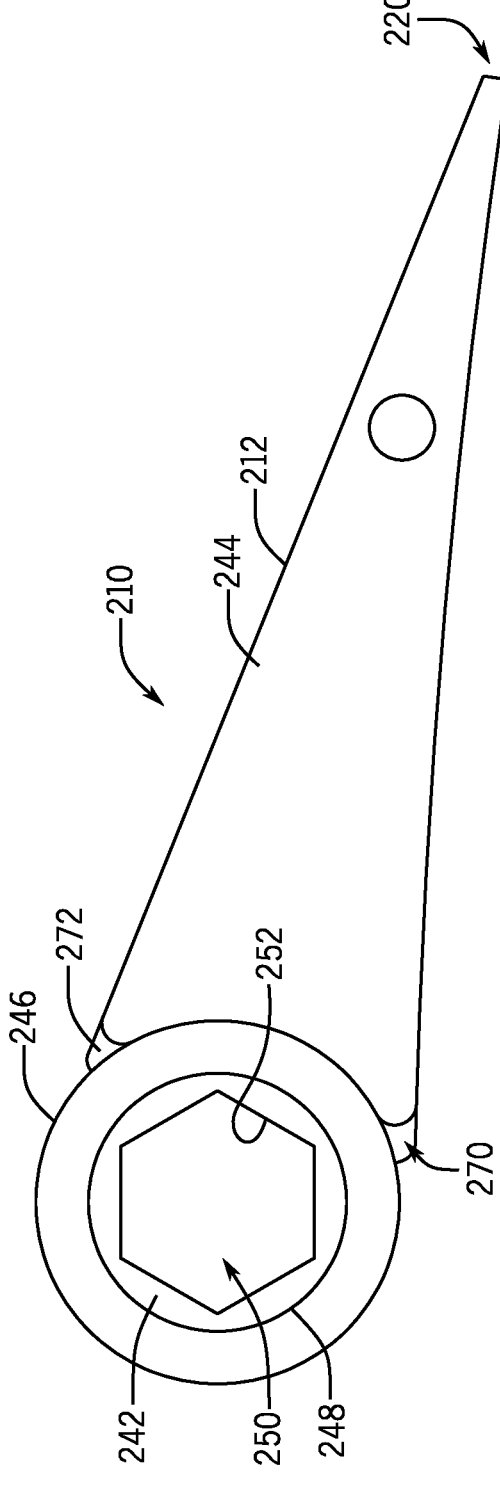

FIGS. 5A-5C illustrate a perspective, top, and side view of an airfoil structure segment 202, FIGS. 6A-6C illustrate a perspective, top, and side view of the first component 208 of the airfoil structure segment 202, and FIGS. 7A-7C illustrate a perspective, top, and side view of the rear component 210 of the airfoil structure segment 202. Referring to FIGS. 5A-7C together, details of the airfoil structure segment 202 will now be described. In the illustrated embodiment, the first component 208 and rear component 210 are coupled together to form the airfoil structure segment 202. Together, the first and rear components 208, 210 can define the features of the airfoil structure segment 202 that allow for the airfoil structure 200 to create lift, stabilize the aircraft assembly 100 during flight, and/or steer the aircraft assembly 100. As one example, the first and rear components 208, 210 can form the outer profile of the airfoil structure segment 202 that extends in a chordwise direction from a leading edge 220 to a trailing edge 222, with the rear component 210 being positioned behind the first component 208 in the chordwise direction (e.g., the rear component 210 can be positioned closer to the trailing edge 222 than the first component 208). As another example, as previously described, the first and rear components 208, 210 can couple together to form the hinge assembly 214 which can pivot the rear component 210 relative to the first component 208 to control the aircraft assembly 100 (e.g., by adjusting the control surface 212). Additional details of these and other examples are described herein.

The first component 208 can include a body 224 extending from a first end portion 226 to a second end portion 228 along the chordwise direction. The body 224 can define an interior 230 and can include one or more apertures 232 formed within. The apertures 232 can be used to receive an elongated members within the aperture 232 for various purposes (e.g., improving the mechanical properties of the airfoil structure 200, coupling airfoil structure segments together 202, etc.). The body 224 can also include one or more hinge loops 234 which can assist with coupling the first component 208 to the rear component 210 in a fashion that enables rotational movement of the rear component 210 relative to the first component 208. As shown in the illustrated embodiments, the hinge loops 234 can be formed at the second end portion 228 of the body 224 so that the body 224 extends along the chordwise direction from the leading edge 220 to the one or more hinge loops 234. Alternatively, the first end portion 226 of the first component 208 may not coincide with the leading edge 220. For example, the first component 208 itself may be positioned behind (relative to the chordwise direction) another component (not shown) that defines the leading edge 220.

Each hinge loop 234 can be formed from a wall 236 that extends generally rearward from a rear-facing surface 237 of the body 224. The wall 236 defines an outer surface 238 and an inner passage 240. The inner passage 240 can have a substantially circular profile defined cooperatively by the rear-facing surface 237 and the wall 236 and can be circumferentially closed about an axis that extends in the spanwise direction. Additionally, the inner passage 240 can be concentric with other inner passages 240 formed by the other hinge loops 234 of the first component 208. This arrangement allows for the inner passage 240 to receive a portion of the rear component 210 within and thereby couple the rear component 210 to the first component 208.

The rear component 210 can include a body portion 244 and an interface member 242 coupled to a body portion 244 through one or more attachment portions 246. The attachment portions 246 may rigidly couple the interface member 242 to the body portion 244. In some examples, the rear component 210 extends in the chordwise direction from the interface member 242 to the trailing edge 222, with the body portion 244 being positioned behind the interface member 242 in the chordwise direction. The interface member 242 can be an elongated structure with an outer surface 248 and a passage 250 defined by a circumferentially inner surface 252. The elongated structure of the interface member 242 can be configured to extend within, and be circumscribed by, the inner passage 240 of the hinge loops 234. For example, the outer surface 248 can have a cylindrical shape that is sized less in diameter than the diameter of the inner passage 240, which allows for the interface member 242 to be positioned within the hinge loops 234. The passage 250 can be sized to receive the steering member 300 within, and the inner surface 252 can also be configured for keyed interaction with the steering member 300, as noted above. For example, the inner surface 252 can have a hexagonally shaped cross-section, defined in a plane normal to the spanwise direction, that is complementary to the cross-section of outer surface 304 of the steering member 300, so that the inner surface 252 couples to the outer surface 304 to drive the interface member 242 in rotational motion when the steering member 300 is positioned within the passage 250 and driven in rotation.

The body portion 244 can form the trailing edge 220 of the airfoil structure segment 202. The body portion 244 can be spaced apart from the interface member 242. Stated differently, the interface member 242 and a front-facing surface 272 of the body portion 244 can be spaced apart so that a gap 270 extends in the chordwise direction from the front-facing surface 272 to the outer surface 248 of the interface member 242 and the components are not in direct contact. The front-facing surface 272 of the body portion 244 may be concave, such that the gap 270 is generally arcuate in a plane normal to the spanwise direction. However, other configurations of the gap 270 are also contemplated. The gap 270 may be sized to receive the wall 236, extending from the first component 208, therethrough in a clearance fit to couple the first component 208 to the rear component 210.

The body portion 244 can have an outer surface that forms the control surface 212. In some examples, the outer surface of the body portion 244 can form ailerons, elevators, rudders, spoilers, flaps, slats, and other controlling surfaces that can be used to aerodynamically control the aircraft assembly 100.

The attachment portions 246 can each include a body 254 that extends rearward, in the chordwise direction, from the outer surface 248 of the interface member 242 and affixes the interface member 242 to the body portion 244 at various intervals along the rear component 210. While the attachment portion 246 couples the interface member 242 to the body portion 244, the interface member 242 and the body portion 244 remain spaced apart by the gap 270 between adjacent attachment portions 246. In some examples, the body 254 of the attachment portion 246 can define one or more free edges 256 which each can taper from the outermost diameter of the body 254 towards the outer surface 248 of the interface member 242 at an acute angle relative to the spanwise direction. These free edges 256 can enable the 3D printing of the attachment portion 246 in a desired stacking direction, as will be discussed in more detail below, as well as improve the rigidity of the attachment portion 246.

As previously described, the first component 208 and rear component 210 can be coupled together in a manner that forms the hinge assembly 214 and thereby allows for the rear component 210 to pivot relative to the first component 208. In some embodiments, the hinge assembly 214 can be formed from at least the hinge loops 234, the interface member 242, and the attachment portions 246. Together, these components can rotationally couple and interlock the first and rear components 208, 210 together. For example, the interface member 242 can extend though the inner passage 240 of the hinge loops 234 and, when this occurs, at least a portion of the wall 236 of the hinge loops 234 can be disposed in the gap 270 between the interface member 242 and the body portion 244 of the rear component 210. This arrangement of the rear component 210 with the first component 208 (e.g., having a portion of the hinge loops 234 disposed between the interface member 242 and the body portion 244) can interlock the two components together. To rotationally couple the first component 208 with the rear component 210, the interface member 242 can be sized so that the interface member 242 can rotate within the inner passage 240 while the interface member 242 is circumscribed by the hinge loops 234.

The first and rear components 208, 210 can include features that accommodate these components being both rotationally coupled and interlocked together. As one example, the first component 208 can include gaps 258 and slots 260 that extend in the spanwise direction between the hinge loops 234. These gaps 258 and slots 260 can be spaced and shaped complementary to a spacing and shape of the attachment portions 246 to reduce or eliminate interference of the attachment portions 246 with the rotational movement of the rear component 210. For instance, as shown in the illustrated embodiment, each of the attachment portions 246 can extend spanwise within the gap 258 defined between the adjacent hinge loops 234, and the outermost diameter of the attachment portion can be received within one of the slots 260 formed at the second end portion 228 of the body 224. This arrangement interdigitates the attachment portions 246 with the hinge loops 234 and allows for interface member 242 to rotate freely about a spanwise axis. Furthermore, the gaps 258 and slots 260 may stabilize the spanwise position of the attachment portions 246, and thus of the rear component 210, relative to the front component 208 during the rotation.

In some examples, the first and rear components 208, 210 couple together in a manner that substantially limits the effect of the hinge assembly 214 on the outer mold line of the airfoil structure 200. For instance, as illustrated in FIG. 5C, portions of the hinge assembly 214 can be entirely, or substantially, contained within the outer surface of the airfoil structure segment 202. Stated differently, the hinge assembly 214 does not substantially protrude beyond the outer profile defined by the body 224 and the body portion 244. This arrangement can improve the aerodynamic profile, as any parasitic drag resulting from the portions of the hinge assembly 214 is limited, which results in a cleaner outer mold line for the airfoil structure 200.

Referring now to FIGS. 2-7C, in operation, the steering member 300 can be used to adjust the hinge assembly 214 by coupling to the interface member 242. In some embodiments, the outer surface 248 of the steering member 300 can engage with the passage 250 of the interface member 242. For example, the passage 250 of the interface member 242 can be at least partially defined by a keyed surface 252 that is complementary to the keyed outer surface 304 of the steering member 300. This arrangement can rotationally couple the interface member 242 with the steering member 300 so that the steering member 300 is configured to cooperate with the interface member 242 to pivot the rear component 210 relative to the first component 208. Accordingly, when the steering member 300 is rotated about a spanwise axis, the interface member 242 also rotates and causes the body portion 244 of the rear component 210 to pivot upwards or downwards depending on the direction of rotation.

In some embodiments, the hinge assembly 214 can be adjusted through arrangements other than a steering member 300. As one example, a motor or actuator can directly couple to the body portion 244 of the rear component 210 to pivot the rear component 210 relative to the first component 208. As another example, a motor or actuator can couple directly to the attachment portions 246 or the outer surface 248 of the interface member 242 to rotate the attachment portions 246 or interface member 242 and thereby pivot the rear component 210 relative to the first component 208. For example, a motor or actuator can be drivingly coupled to a feature (e.g., a set of gear teeth, a tab, etc.) extending outward from the outer surface of the interface member 242 and cause the rear component 210 to pivot relative to the first component 208 when the motor or actuator engages this feature. Adjusting the hinge assembly 214 in any of these manners can allow for the operator of the aircraft assembly 100 to adjust specific control surfaces 212 on the airfoil structure 200 independently from other control surfaces 212 and without the need of a steering member 300.

Figure 8:
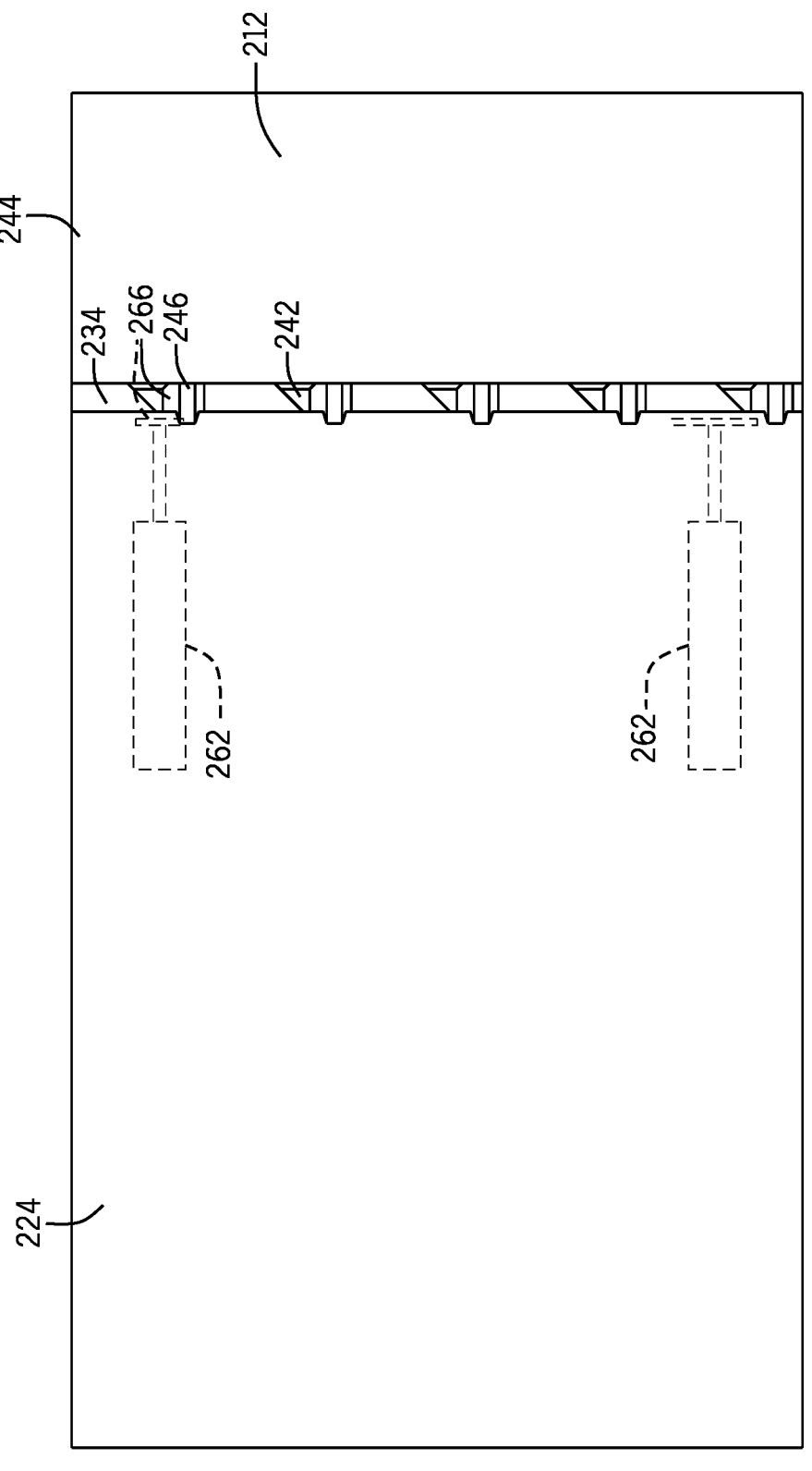
FIG. 8 illustrates a schematic view of a motor that may be used with the airfoil structure of FIG. 2 in accordance with one or more embodiments of the present disclosure.

As a non-limiting example of these non-steering member arrangements, FIG. 8 illustrates a schematic view of a motor 262 that is coupled in an alternative fashion to the hinge assembly 214 for rotationally driving the hinge assembly 214. As shown in FIG. 8, one or more motors 262 can couple to the airfoil structure segment 202 and be configured to interface with the hinge assembly 214. In some examples, the motors 262 can be disposed within the interior 230 of the first component 208. In other examples, the motors 262 are installed on the outer surface of the body 224 of the first component 208. In any of these examples, the motors 262 can be configured to engage the hinge assembly 214. For instance, as shown in the illustrated embodiment, each motor 262 can be coupled to one of the attachment portions 246 via a pair of cooperating bevel gears 266, with one gear rigidly fixed to a rotating shaft of the motor 262 and one gear defined on the disk-shaped outer surface 248 of the attachment portion 246. The bevel gears 266 are just one example, and other geared arrangements that include a first gear member affixed to the hinge assembly 214 in geared cooperation with a second gear member rotationally drivable by the motor 262 are also contemplated. By coupling the motors 262 to the outer surface 248 of the attachment portions 246, the motors 262 can rotate the attachment portions 246 and thus can pivot the rear component 210 relative to the first component 208 as desired.

As previously noted, in some embodiments, the airfoil structure segments 202 can be manufactured from an additive manufacturing process. Accordingly, in some embodiments, the first and rear components 208, 210 can also be manufactured from an additive manufacturing process. In some of these embodiments, or otherwise, the first and rear components 208, 210 can each define a monolithic and integrally formed structure. For example, the entire first component 208 (e.g., the body 224, the hinge loops 234, apertures 232, etc.) can be formed from an additive manufactured process so that the first component 208 is a monolithic, integrally formed structure. Similarly, the entire rear component 210 (e.g., interface member 242, the body portion 244, the attachment portions 246, etc.) can be formed from an additive manufactured process so that the rear component 210 is a monolithic, integrally formed structure.

With reference again to FIG. 5B, in some examples, the first and rear components 208, 210 are formed during the same additive manufacturing process, manufactured together in a unified process on a bed or platform 290 of a 3D printer, in the coupled arrangement. This allows for the first and rear components 208, 210 each to be monolithic, integrally formed structures, while also allowing for the first and rear components 208, 210 to be rotationally coupled and interlocked together. Statedly differently, the first and rear components 208, 210 can be formed together, layer by layer by the additive manufacturing process in a stacking direction 292, in a state of being rotationally coupled and interlocked together by the hinge assembly 214, and thus do not require a separate process to couple and interlock the first and rear components 208, 210 together. Moreover, in some embodiments, the unified additive manufacturing process enables an advantageous interlocking between the hinge loops 234 and the interface member 242 which would not be feasible with an integrally formed first component 208 and an integrally formed rear component 210 that were additively (or otherwise) manufactured in separate processes. In particular, in some embodiments, the hinge loops 234 completely circumscribe one or more portions 296 of the interface member 242 along the stacking direction 292, and the one or more portions 296 are interdigitated with the attachment portions 246.

More specifically, the initial layers of the first and rear components 208, 210 deposited on the platform 290 include a base 294 of the interface member 242, which is spaced apart from the layers of the rear-facing surface 237 (shown in FIG. 6C) of the first component 208. As layers continue to be added in the stacking direction 292, the layers of a first attachment portion 246 are deposited on the base 294, and those layers are also spaced apart from the rear-facing surface 237 of the first component 208 by virtue of the slot 260 (shown in FIG. 6B). After the layers of the first attachment portion 246 are completed, the layers of the first component 208 include a first wall 236 defining a first hinge loop 234. The layers of the wall 236 circumscribe the layers of the interface member 242 along the portion 296 and are spaced apart from the layers of the front-facing surface 272 of the rear component 210 and of the interface member itself. After the layers of the first and rear components 208, 210 along the first portion 296 are completed, the process iterates with the layers including the next attachment portion 296 and next portion 296, until the parts are completed. Accordingly, although the layers of the first and rear components 208, 210 are deposited in a unified additive manufacturing process, a spacing or "clearance gap" is always maintained between the layers of the first component 208 and the layers of the rear component 210, preventing the two components from fusing together while the elements of the hinge assemblies 214 are deposited, including through the portions 296 where the hinge loops 234 completely circumscribe the interface member 242. However, embodiments in which the hinge loops 234 do not completely circumscribe the interface member 242 along any portion of the interface member are also contemplated.

In certain embodiments, the free edge 256 of the attachment portion can taper outward along the stacking direction 292 at an acute angle selected to enable each of the lower layers of the attachment portion 246 to support the slightly overhanging next layer of the attachment portion 246 as the diameter of the attachment portion grows along the stacking direction 292. Likewise, a free edge 264 of the wall 236 can taper outward along the stacking direction 292 at an acute angle selected to enable each of the lower layers of the wall 236 to support the slightly overhanging next layer of the wall 236 as the diameter of the hinge loop 234 grows along the stacking direction 292. However, other configurations of the edges of the attachment portion 246 or the wall 236 are also contemplated.

It would not be possible to insert the interface member 242, rigidly connected to the body portion 244 of the rear component by the attachment portions 246, into such a relationship with the hinge loops 234 after manufacturing the first and rear components 208, 210 in separate processes. Accordingly, the unified additive manufacturing process for the first and rear components 208, 210 as described herein provides rotational coupling of the first and rear components 208, 210 for rotation about a spanwise axis (parallel to the stacking direction 292), using hinge structures that are integrally formed with the first and rear components 208, 210 and can include complete circumscribing of the "pin" or interface member 242, which combines advantages in providing strength and stability of the hinge assembly 214 while eliminating a post-manufacture rotational coupling step requiring additional hinge hardware.

Figure 9:
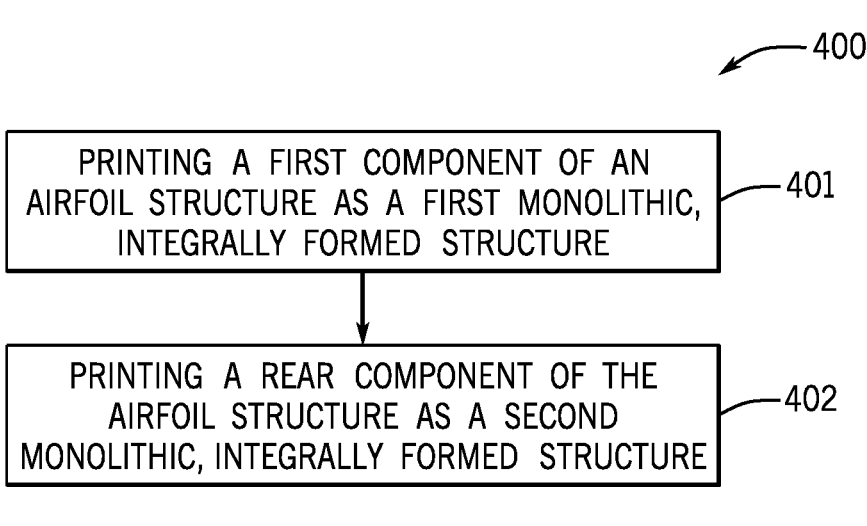
FIG. 9 is a flow diagram illustrating an example method for manufacturing an airfoil structure in accordance with one or more embodiments of the present disclosure.

FIG. 9 is a flow diagram illustrating an example method 400 for manufacturing an airfoil structure. The method 400 can be used to assemble any of the airfoil structures described herein, including, for example, embodiments of the airfoil structure 200 described in FIGS. 1-8. The method 400 can be performed using any desired additive manufacturing process, including, for example, extrusion deposition, binder jetting, powder fusion, or other 3D printing or additive process.

At step 401, the method 400 begins with printing, on a 3D printer platform, a first component of an airfoil structure as a first monolithic, integrally formed structure. As previously described with respect to FIGS. 5A-6C, the first component (e.g., the first component 208) can include a body (e.g., the body 224) that includes one or more hinge loops (e.g., the hinge loops 234) for rotationally coupling to a rear component (e.g., the rear component 210). Accordingly, at step 401, the body, hinge loops, and other features (e.g., the gap 258, slots 260, etc.) can be formed through the additive manufacturing process. These features can be formed in a manner that results in the first component forming a monolithic, integrally formed structure.

In some examples, step 401 can include printing a free edge (e.g., the free edge 264 shown in FIGS. 5B, 6A, and 6B) of at least one of the one or more hinge loops. In some instances, the free edge can taper outward at an acute angle relative to a stacking direction of the plurality of layers (and/or the spanwise direction). This free edge can be formed from materials that are not in direct contact with the layers directly below and at an acute angle small enough to prevent collapse of any unsupported portion during printing.

At step 402, the method 400 includes printing, on a 3D printer platform, a rear component of an airfoil structure as a second monolithic, integrally formed structure. As previously described with respect to FIGS. 5A-5C and 7A-7C, the rear component (e.g., the rear component 210) can include an interface member (e.g., the interface member 242) that is coupled to a body portion (e.g., the body portion 244) through one or more attachment portions (e.g., the attachment portions 246). Accordingly, at step 402, the interface member, body portion, attachment portions, and other features can be formed through the additive manufacturing process. These features can be formed in a manner that results in the rear component forming a monolithic, integrally formed structure.

In some examples, step 402 can include printing a body portion positioned behind the interface member in the chordwise direction and printing one or more attachment portions affixing the interface member to the body portion. Additionally, in some embodiments, step 402 can include printing an inner surface (e.g., the inner surface 252) of the interface member. This inner surface can define a passage (e.g., a passage 250) configured to receive a steering component (e.g., the steering member 300) therein. Additionally, the inner surface can be configured to engage a keyed outer surface (e.g., the outer surface 304) of the steering member, which can result in pivoting the rear component relative to the first component in response to rotational motion of the steering member. In some examples, the inner surface of the interface member can have a second hexagonal shape that is configured to be complementary to a first hexagonal shape of an outer surface of the steering member. In various examples, step 402 includes printing a free edge (e.g., the free edge 256) of at least one of the one or more attachment portions. This free edge can taper outward at an acute angle relative to a stacking direction of the plurality of layers and can enable the 3D printing of the attachment portion in the stacking direction 292, as well as improve the rigidity of the attachment portions.

In some embodiments, step 402 can optionally include printing a feature that assists with the coupling a motor to a portion of the rear component. For example, step 402 can include printing at least one feature extending outward from an interface member, with this feature being configured to be driven by a motor (e.g., the motor 262) to pivot the rear component relative to the first component. In some instances, printing the at least one feature can include printing a first gear member configured for geared cooperation with a second gear member driven by a motor.

In some embodiments, step 401 and step 402 can together be completed in parallel during the same additive manufacturing process. Stated differently, the first component formed through step 401 can also be formed during the same deposition steps as the rear component formed through step 402, such as in the example discussed above. In some of these embodiments, or otherwise, the first and rear components can be formed in a manner that rotationally couples and interlocks the components together. For example, the interface member can be printed within the hinge loops, which can interlock the first component with the rear component and allow for the rear component to pivot relative to the first component. Completing these steps 401, 402 in parallel can improve the speed of manufacture as the first and rear components do not require a separate coupling process.

Figure 10:
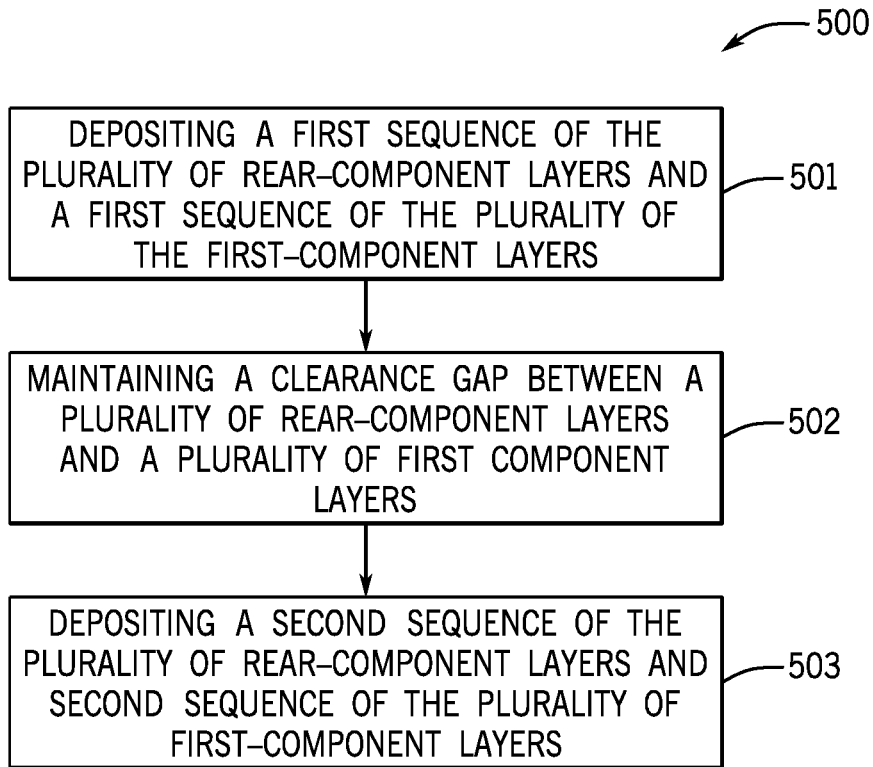
FIG. 10 is a flow diagram illustrating an example method for depositing layers on a 3D printer platform in accordance with one or more embodiments of the present disclosure.

FIG. 10 is a flow diagram illustrating an example method 500 for depositing a plurality of layers on a 3D printer platform. The method 500 can be used while forming any of the airfoil structures described herein, including, for example, embodiments of the airfoil structure segments 202 described in FIGS. 1-7C. In some examples, this method 500 can be used for printing the first and rear components described in the method 400 of FIG. 9. Additionally, the method 500 can be performed using any desired additive manufacturing process, including, for example, extrusion deposition, binder jetting, powder fusion, or other 3D printing or additive process.

At step 501, the method 500 begins with depositing, in a first sequence of co-component layers of the plurality of layers, a first sequence of the plurality of rear-component layers and a first sequence of the plurality of first-component layers. The first component (e.g., the first component 208) can include a plurality of first-component layers that form the features of the first component (e.g., the body 224, the hinge loops 234, etc.). Similarly, the rear component (e.g., the rear component 210) can include a plurality of rear component layers that form the features of the rear component (e.g., the interface member 242, the attachment portions 246, etc.). During step 501, the first sequence of the plurality of rear-component layers and the first sequence of the plurality of first-component layers can be deposited during the same sequence. Stated differently, a rear-component layer can be deposited during the same deposition step as a first-component layer.

In some embodiments, the some of the plurality of layers from both the first-component layers and the rear-component layers can form components that are rotationally coupled and interlocked together. For example, the first sequence of rear-component layers can include a portion of an interface member and the first sequence of first-component layers can include a portion of the one or more hinge loops. In some of these examples, or otherwise, the portion of the one or more hinge loops can circumscribe the portion of the interface member, as described above. Furthermore, in some instances, a portion of the one or more hinge loops can be circumferentially closed within the first sequence of co-component layers.

At step 502, the method 500 optionally includes maintaining, throughout the printing of the first component and the printing of the rear component, a clearance gap between a plurality of rear-component layers and a plurality of first-component layers, as discussed above. In some examples, the clearance gap is sufficient to prevent fusion between the plurality of rear-component layers and the plurality of first-component layers. Accordingly, in some of these examples, or otherwise, the clearance gap can ensure the printed features from the first-component layers and rear-component layers can rotate relative to one another.

At step 503, the method 500 optionally includes depositing, in a second sequence of co-component layers of the plurality of layers, a second sequence of the plurality of rear-component layers and a second sequence of the plurality of first-component layers. The second sequence of rear-component layers can include any feature of the rear component, including a portion of the body portion and a portion of the one or more attachment portions. Additionally, the second sequence of first-component layers can include any feature of the first component, including portions of the body of the first component. In some examples, the second sequence of first-component layers is offset, in a stacking direction of the plurality of layers, from each of the one or more hinge loops.

While the method 500 references printing a plurality of layers in a first sequence or in a second sequence, those of ordinary skill in the art will appreciate that these terms (such as first, second, third, etc.) are merely labels. Accordingly, these terms do no imply any sequential or ordinal meaning, unless the context or a specific statement indicates otherwise.

This disclosure is not intended to be exhaustive or to limit the present technology to the precise forms disclosed herein. For instance, although specific embodiments are disclosed herein for illustrative purposes, various equivalent modifications are possible without deviating from the present technology, as those of ordinary skill in the relevant art will recognize. In some cases, well-known structures and functions have not been shown and/or described in detail to avoid unnecessarily obscuring the description of the embodiments of the present technology. Furthermore, although steps of methods may be presented herein in a particular order, in alternative embodiments the steps may have another suitable order, including being performed concurrently in a parallel process when possible.

Certain aspects of the present technology disclosed in the context of particular embodiments can be combined or eliminated in other embodiments. Furthermore, while advantages associated with certain embodiments may have been disclosed in the context of those embodiments, other embodiments can also exhibit such advantages, and not all embodiments need necessarily exhibit such advantages or other advantages disclosed herein to fall within the scope of the present technology. The embodiments have been particularly shown and described, but it will be understood that various changes in form and details may be made. For example, although various embodiments have been described as having particular features and/or combinations of components, other embodiments are possible having any combination or sub-combination of any features and/or components from any of the embodiments described herein. The specific configurations of the various components can also be varied. For example, the size and specific shape of the various components can be different than the embodiments shown, while still providing the functions as described herein. Furthermore, in some examples, the illustrations describing some embodiments can hide particular features of the embodiment so as to not obscure the illustration of other features within the embodiment. Accordingly, this disclosure and associated technology can encompass other embodiments not expressly shown and/or described herein.

Throughout this disclosure, the singular terms "a," "an," and "the" include plural referents unless the context clearly indicates otherwise. Similarly, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. Additionally, the terms "comprising" and the like are used throughout this disclosure to mean including at least the recited feature(s) such that any greater number of the same feature(s) or one or more additional types of features are not precluded. Directional terms, such as "upper," "lower," "front," "back," "vertical," and "horizontal," may be used herein to express and clarify the relationship between various elements. It should be understood that such terms do not denote absolute orientation. Reference herein to "one embodiment," "an embodiment," or similar formulations means that a particular feature, structure, operation, or characteristic described in connection with the embodiment can be included in at least one embodiment of the present technology. Thus, the appearances of such phrases or formulations herein are not necessarily all referring to the same embodiment. Furthermore, various particular features, structures, operations, or characteristics may be combined in any suitable manner in one or more embodiments. Where appropriate, relative terms, such as "about," "substantially," and "approximately," can be understood to incorporate standard tolerances. For example, two members that are "substantially parallel" may be understood to mean two members that are parallel within standard engineering tolerances.

We claim:

1. A method of manufacturing an airfoil structure of an aircraft assembly, the airfoil structure extending in a chordwise direction from a leading edge to a trailing edge, the method comprising:

printing, on a 3D printer platform using an additive manufacturing process, a first component of the airfoil structure as a first monolithic, integrally formed structure, wherein the first component includes one or more hinge loops; and during printing of the first component, printing, on the 3D printer platform using the additive manufacturing process, a rear component of the airfoil structure as a second monolithic, integrally formed structure, wherein the rear component includes an interface member extending within the one or more hinge loops.

2. The method of claim 1, wherein:

the additive manufacturing process includes depositing a plurality of layers on the 3D printer platform;

the first component includes a plurality of first-component layers;

the rear component includes a plurality of rear-component layers; and the method further comprises depositing, in a first sequence of co-component layers of the plurality of layers, a first sequence of the plurality of rear-component layers and a first sequence of the plurality of first-component layers.

3. The method of claim 2, further comprising maintaining, throughout the printing of the first component and the printing of the rear component, a clearance gap between the plurality of rear-component layers and the plurality of first-component layers, the clearance gap sufficient to prevent fusion between the plurality of rear-component layers and the plurality of first-component layers.

4. The method of claim 2, wherein the first sequence of rear-component layers includes a portion of the interface member and the first sequence of first-component layers includes a portion of the one or more hinge loops, and wherein the portion of the one or more hinge loops circumscribes the portion of the interface member.

5. The method of claim 4, wherein the portion of the one or more hinge loops is circumferentially closed within the first sequence of co-component layers.

6. The method of claim 4, wherein printing the rear component includes printing a body portion positioned behind the interface member in the chordwise direction and printing one or more attachment portions affixing the interface member to the body portion.

7. The method of claim 6, further comprising depositing, in a second sequence of co-component layers of the plurality of layers, a second sequence of the plurality of rear-component layers and a second sequence of the plurality of first-component layers, wherein the second sequence of rear-component layers includes a portion of the body portion and a portion of the one or more attachment portions, and the second sequence of first-component layers is offset, in a stacking direction of the plurality of layers, from each of the one or more hinge loops.

8. The method of claim 6, wherein printing the rear component comprises printing a free edge of at least one of the one or more attachment portions, the free edge tapering outward at an acute angle relative to a stacking direction of the plurality of layers.

9. The method of claim 2, wherein printing the first component comprises printing a free edge of at least one of the one or more hinge loops, the free edge tapering outward at an acute angle relative to a stacking direction of the plurality of layers.

10. The method of claim 2, wherein printing the rear component comprises printing an inner surface of the interface member, the inner surface defining a passage configured to receive a steering member therein, wherein the inner surface is configured to engage a keyed outer surface of the steering member to pivot the rear component relative to the first component in response to rotational motion of the steering member.

11. The method of claim 10, wherein the inner surface of the interface member has a second hexagonal shape configured to be complementary to a first hexagonal shape of an outer surface of the steering member.

12. The method of claim 1, wherein printing the rear component comprises printing at least one feature extending outward from the interface member, the at least one feature configured to be driven by a motor to pivot the rear component relative to the first component.

13. The method of claim 12, wherein printing the at least one feature comprises printing a first gear member configured for geared cooperation with a second gear member driven by a motor.

14. The method of claim 1, wherein the interface member of the rear component has an outer surface that has a cylindrical shape, wherein the interface member extends within the one or more hinge loops of the first component such that the outer surface of the interface member is concentric with the one or more hinge loops.

15. The method of claim 1, wherein the one or more hinge loops comprises a plurality of hinge loops, and the interface member extends within each of the plurality of hinge loops.

* * * * *